(12) United States Patent
Wurster et al.

(10) Patent No.: US 12,182,271 B2
(45) Date of Patent: Dec. 31, 2024

(54) DETECTING SOFTWARE VULNERABILITIES IN A BINARY CODE

(71) Applicant: BlackBerry Limited, Waterloo (CA)

(72) Inventors: Glenn Daniel Wurster, Kitchener (CA); Andrew Chin, Burnaby (CA); Benjamin Gnahm, Augsburg (DE)

(73) Assignee: BlackBerry Limited, Waterloo (CA)

( * ) Notice: Subject to any disclaimer, the term of this patent is extended or adjusted under 35 U.S.C. 154(b) by 336 days.

(21) Appl. No.: 17/520,451

(22) Filed: Nov. 5, 2021

(65) Prior Publication Data

US 2023/0142345 A1  May 11, 2023

(51) Int. Cl.
*G06F 21/57* (2013.01)
*G06F 21/54* (2013.01)

(52) U.S. Cl.
CPC ............ *G06F 21/577* (2013.01); *G06F 21/54* (2013.01); *G06F 2221/033* (2013.01)

(58) Field of Classification Search
CPC .. G06F 21/577; G06F 21/54; G06F 2221/033; G06F 21/566; G06F 21/52; G06F 11/3616; G06F 11/3684; G06F 11/3688
See application file for complete search history.

(56) References Cited

U.S. PATENT DOCUMENTS

| | | | |
|---|---|---|---|
| 6,523,119 B2 | 2/2003 | Pavlin et al. | |
| 7,024,564 B2 | 4/2006 | Pavlin et al. | |
| 7,711,988 B2 * | 5/2010 | Zhou | G06F 11/348 |
| | | | 714/30 |
| 7,886,148 B2 | 2/2011 | Kiriansky et al. | |
| 8,307,435 B1 * | 11/2012 | Mann | G06F 21/566 |
| | | | 717/124 |
| 8,782,435 B1 * | 7/2014 | Ghose | H04L 9/3247 |
| | | | 712/216 |
| 8,955,111 B2 | 2/2015 | Glew et al. | |

(Continued)

FOREIGN PATENT DOCUMENTS

EP  3572944  11/2019

OTHER PUBLICATIONS

U.S. Appl. No. 17/520,445, Wurster et al., Nov. 5, 2021.

(Continued)

*Primary Examiner* — Robert B Leung
(74) *Attorney, Agent, or Firm* — Fish & Richardson P.C.

(57) ABSTRACT

Systems, methods, and software can be used to detect software errors in a binary code. In some aspects, a method comprises: obtaining a binary code; generating a base memory-write profile for the binary code, wherein the base memory-write profile comprises a count of memory updates for each of a plurality of memory locations during an execution of the binary code according to a base input; for each of a plurality of test inputs, generating a test memory-write profile for the binary code, wherein the test memory-write profile comprises a count of memory updates for each memory location during an execution of the binary code according to the test input; comparing the base memory-write profile and the plurality of test memory-write profiles; and generating a notification based on the comparison, wherein the notification indicates whether there is a difference between the base memory-write profile and the plurality of test memory-write profiles.

20 Claims, 4 Drawing Sheets

(56) References Cited

U.S. PATENT DOCUMENTS

| | | | |
|---|---|---|---|
| 8,966,312 B1* | 2/2015 | Gupta | G06F 11/1469 |
| | | | 714/21 |
| 9,027,000 B2 | 5/2015 | Guerrera et al. | |
| 9,177,153 B1* | 11/2015 | Perrig | G06F 21/57 |
| 9,361,102 B2 | 6/2016 | Tan et al. | |
| 9,552,285 B2* | 1/2017 | Godefroid | G06F 11/3688 |
| 9,922,074 B1* | 3/2018 | Hoffmann | G06F 16/275 |
| 10,037,429 B1 | 7/2018 | Rodriguez Bravo et al. | |
| 10,303,888 B2 | 5/2019 | Rodriguez Bravo et al. | |
| 10,310,969 B2* | 6/2019 | Bhattacharjee | G06F 8/71 |
| 10,445,495 B2 | 10/2019 | Mehr | |
| 10,509,906 B2* | 12/2019 | Gupta | G06F 21/554 |
| 10,628,586 B1 | 4/2020 | Jung | |
| 10,678,907 B2 | 6/2020 | Aditham et al. | |
| 10,726,137 B2 | 7/2020 | Rodriguez Bravo et al. | |
| 11,144,638 B1* | 10/2021 | Golden | G06F 21/566 |
| 11,256,808 B2 | 2/2022 | Jung | |
| 11,269,990 B1 | 3/2022 | Aditham et al. | |
| 11,349,864 B2 | 5/2022 | Boulton | |
| 11,409,870 B2* | 8/2022 | Gupta | G06F 9/485 |
| 11,562,071 B2 | 1/2023 | Jung | |
| 2001/0056539 A1 | 12/2001 | Pavlin et al. | |
| 2003/0110388 A1 | 6/2003 | Pavlin et al. | |
| 2007/0150599 A1* | 6/2007 | Neogi | G06F 16/217 |
| | | | 709/227 |
| 2009/0007077 A1* | 1/2009 | Musuvathi | G06F 11/3688 |
| | | | 717/130 |
| 2010/0011209 A1 | 1/2010 | Kiriansky et al. | |
| 2011/0072300 A1 | 3/2011 | Rousseau | |
| 2011/0113405 A1 | 5/2011 | Guerrera et al. | |
| 2012/0079596 A1 | 3/2012 | Thomas et al. | |
| 2012/0084759 A1* | 4/2012 | Candea | G06F 9/45504 |
| | | | 717/134 |
| 2013/0081134 A1 | 3/2013 | Glew et al. | |
| 2015/0370560 A1 | 12/2015 | Tan et al. | |
| 2016/0253497 A1 | 9/2016 | Christodorescu et al. | |
| 2016/0328561 A1* | 11/2016 | Tamir | G06F 21/552 |
| 2018/0211033 A1 | 7/2018 | Aditham et al. | |
| 2018/0322294 A1 | 11/2018 | Rodriguez Bravo et al. | |
| 2018/0322296 A1 | 11/2018 | Rodriguez Bravo et al. | |
| 2018/0322297 A1 | 11/2018 | Rodriguez Bravo et al. | |
| 2018/0349597 A1* | 12/2018 | Sharifi Mehr | G06F 21/52 |
| 2019/0138725 A1 | 5/2019 | Gupta | |
| 2019/0392724 A1* | 12/2019 | Breed | G06V 40/19 |
| 2020/0177621 A1 | 6/2020 | Boulton | |
| 2020/0193034 A1 | 6/2020 | Rodriguez Bravo et al. | |
| 2020/0201998 A1 | 6/2020 | Jung | |
| 2021/0312057 A1* | 10/2021 | Kloth | G06F 3/0623 |
| 2021/0326171 A1* | 10/2021 | Riesen | G06F 9/5038 |
| 2022/0027472 A1 | 1/2022 | Golden et al. | |
| 2022/0129554 A1 | 4/2022 | Jung | |
| 2022/0283864 A1 | 9/2022 | Kwon et al. | |
| 2023/0141142 A1 | 5/2023 | Wurster et al. | |

OTHER PUBLICATIONS

Forrest et al., "A Sense of Self for Unix Processes" In proceedings of the 1996 IEEE Symposium on Security and Privacy, IEEE Computer Society Press, May 1996, 9 pages.

Extended European Search Report in European Appln. No. 22194659.3, dated Mar. 28, 2023, 6 pages.

Manes et al., "Fuzzing: Art, Science, and Engineering" submitted on Dec. 1, 2018, arXiv: 1812.00140V1, 29 pages.

Extended European Search Report in European Appln. No. 22194652.8, mailed on Mar. 7, 2023, 12 pages.

Non-Final Office Action in U.S. Appl. No. 17/520,445, mailed on Mar. 28, 2024, 28 pages.

Notice of Allowance in U.S. Appl. No. 17/520,445, mailed on Jul. 19, 2024, 16 pages.

Notice of Allowance in U.S. Appl. No. 17/520,445, mailed on Aug. 28, 2024, 18 pages.

\* cited by examiner

DETECTING SOFTWARE VULNERABILITIES IN A BINARY CODE

TECHNICAL FIELD

The present disclosure relates to detecting software vulnerabilities in a binary code of software.

BACKGROUND

In some cases, software services can be provided by executable binary code. The binary code is computer software in a binary format. The computer software can be application software, system software (e.g., an operating system or a device driver), or a component thereof. The binary code can also be referred to as executable code.

DESCRIPTION OF DRAWINGS

Like reference numbers and designations in the various drawings indicate like elements.

DETAILED DESCRIPTION

Figure 1:
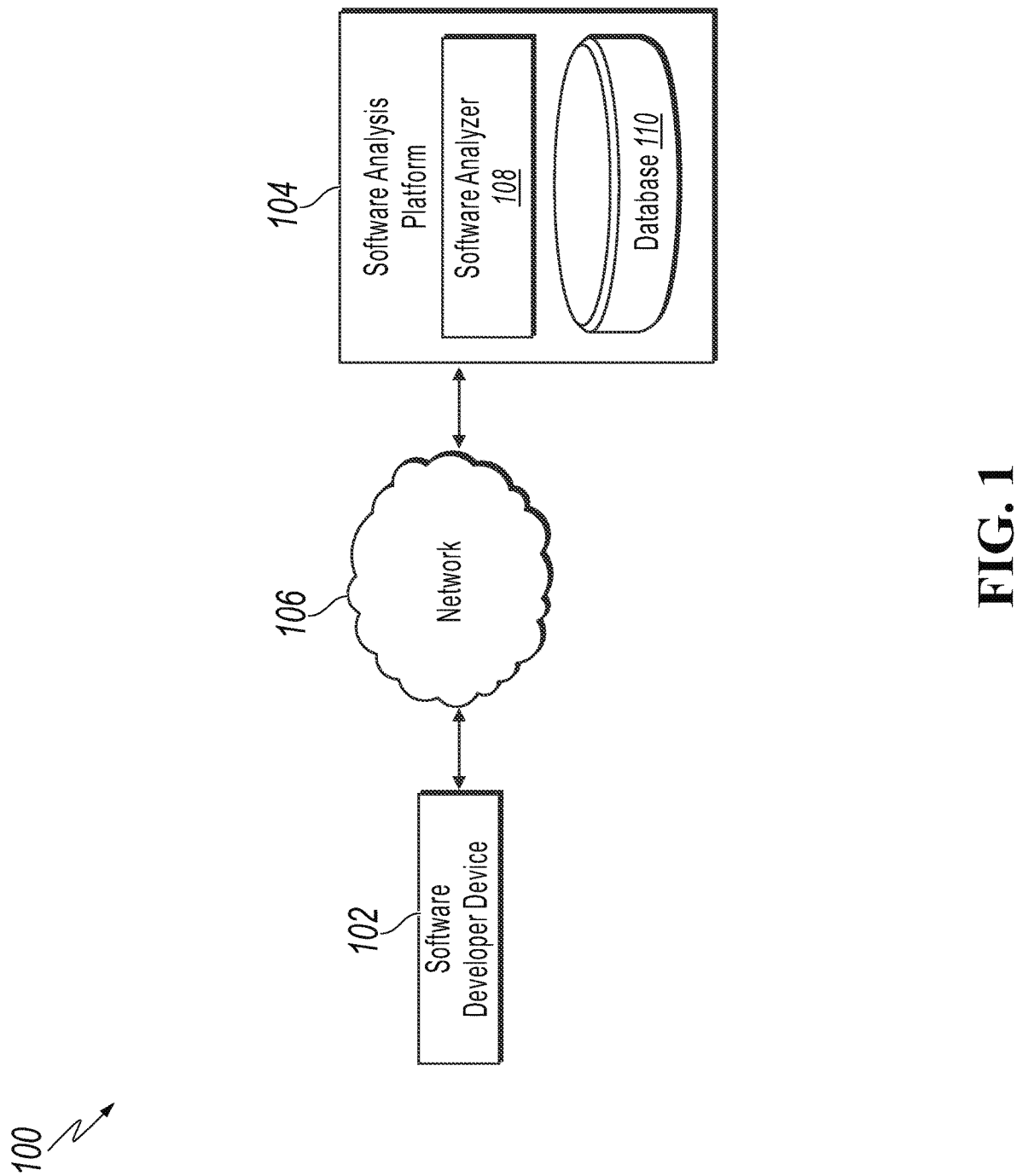
FIG. 1 is a schematic diagram showing an example communication system that provides data communications for detecting software vulnerabilities in a binary code, according to an implementation.

In some cases, a software developer can submit software to a software analysis platform. In some cases, the software can be developed and analyzed on the same device, such as the software developer machine. In other words, the software analysis platform can be a module located on the same device that is used for developing the software. The software can be executed on the software analysis platform to provide software analysis to user devices. Alternatively or additionally, the software can be downloaded to the user's devices. The software analysis platform can be implemented in one or more servers, on a cloud-computing platform, or locally. In some implementations, the software analysis platform can inspect the binary code of the software to detect software vulnerabilities and to access the software's ability to handle fault injections. Faults injected can include input corruption and memory corruption. These faults alter software behavior, or introduce any other security risks to the system that implements the binary code.

If the binary code of the software is submitted without source code, it may be difficult to inspect the software to assess its ability to handle the faults injected. The binary code can include a stream of bytes that are generated by compiling the source code of the software. Thus, the binary code is not in a human readable format and cannot be easily parsed or analyzed.

When a fault is injected into software, the software may respond in different ways depending on the characteristics of the fault and the functions performed by the binary code. For example, in a first case, a fault is injected and corrupts a bit of system memory, however, the corrupted bit of the system memory is not used during the execution of the binary code. As a result, the injected fault does not cause any behavior changes. In a second case, the software may use an injected fault, such as one or more malicious inputs or one or more corrupted bits of memory, and the injected fault may cause the execution behavior of the software code to change. The software recognizes the behavior change and thus recognizes that a fault has been injected, and moves to a design safe state. In a third case, although the injected fault causes behavior changes, the behavior changes are non-obvious. The software may not recognize the behavior changes and thus not recognize that a fault has been injected. In such a scenario, the unrecognized fault may cause serious damages to the system that implements the software. In both the first case and the third case, the software does not generate error alerts. However, the system is corrupted to different degrees. In the first case, the injected fault is not used and does not cause damages. In the third case, the injected fault can cause serious damages that are not recognized by the software. It is important to distinguish between the first case and the third case.

Techniques described herein provide a method to monitor and identify the behavior changes in terms of a memory-write pattern of the binary code, when there is fault injection. For example, the input may be changed into many different values including malicious or invalid values (e.g., injected fault). The impact of a change in input data can be determined based on the changes of the memory-write pattern. Such information (e.g., the impact of a change in data) can be used to crosscheck the error alerts generated by the software. As a result, techniques described herein can determine whether the software can handle the injected fault correctly. FIGS. 1-4 and associated descriptions provide additional details of these implementations.

Techniques described herein produce one or more technical effects. In some cases, the safety risk or security flaw of the software can be determined without having the source code of the software available. For example, the described techniques can determine whether a fault injected into the software results in a change in execution behavior, as well as whether the fault is handled correctly, without having the source code available. Such information can be used to minimize the potential damage or harm caused by risky software, and thus improve the security and safety of the system that implements the binary code. Furthermore, the described techniques can determine the impact of input changes, the impact of memory corruption, or both, and distinguish the first case and the third case as discussed above. Specifically, even when the software does not recognize the fault injection and does not generate error alerts, the described techniques can determine the extent of behavior change due to different inputs or memory corruption. If there are no behavior changes, the injected fault may not be used, which corresponds to the first case. If there are behavior changes, the injected fault may have caused the behavior changes, which corresponds to the third case. As a result, the described techniques can provide additional information regarding fault injection, even when the software does not recognize the fault injection.

FIG. 1 is a schematic diagram showing an example communication system 100 that provides data communications for detecting software vulnerabilities in a binary code, according to an implementation. At a high level, the example communication system 100 includes a software developer device 102 and a software analysis platform 104 that are communicatively coupled with a network 106.

The software developer device 102 represents an application, a set of applications, software, software modules, hardware, or any combination thereof, that can be configured to submit the binary code of software to the software analysis platform 104. The software developer device 102 submitting the binary code is provided as an example. In some cases, the software developer device 102 and the software analysis platform 104 can be the same device. For example, the software analysis platform 104 can be a module located on the software developer device 102. Such a software analysis module is configured to access the binary code of software locally and analyze the binary code for detecting software vulnerabilities. Alternatively or in combination, the binary code can be transmitted to the software analysis platform 104 by an application store server, or any other computing devices or servers. In some cases, the binary code can be downloaded to client devices to be executed on the client devices. Alternatively or additionally, the binary code can also be executed on the software analysis platform 104 to provide software analysis to the client devices.

The software analysis platform 104 can receive the binary code of software and detect programming errors in the binary code. For example, the software analysis platform 104 may detect a programming error in the binary code while handling fault injections, such as input corruption, memory corruption, or both. The software analysis platform 104 can be implemented using one or more computers, computer servers, a cloud-computing platform, or could reside on the same computer as that being used to develop the software.

Figure 2:
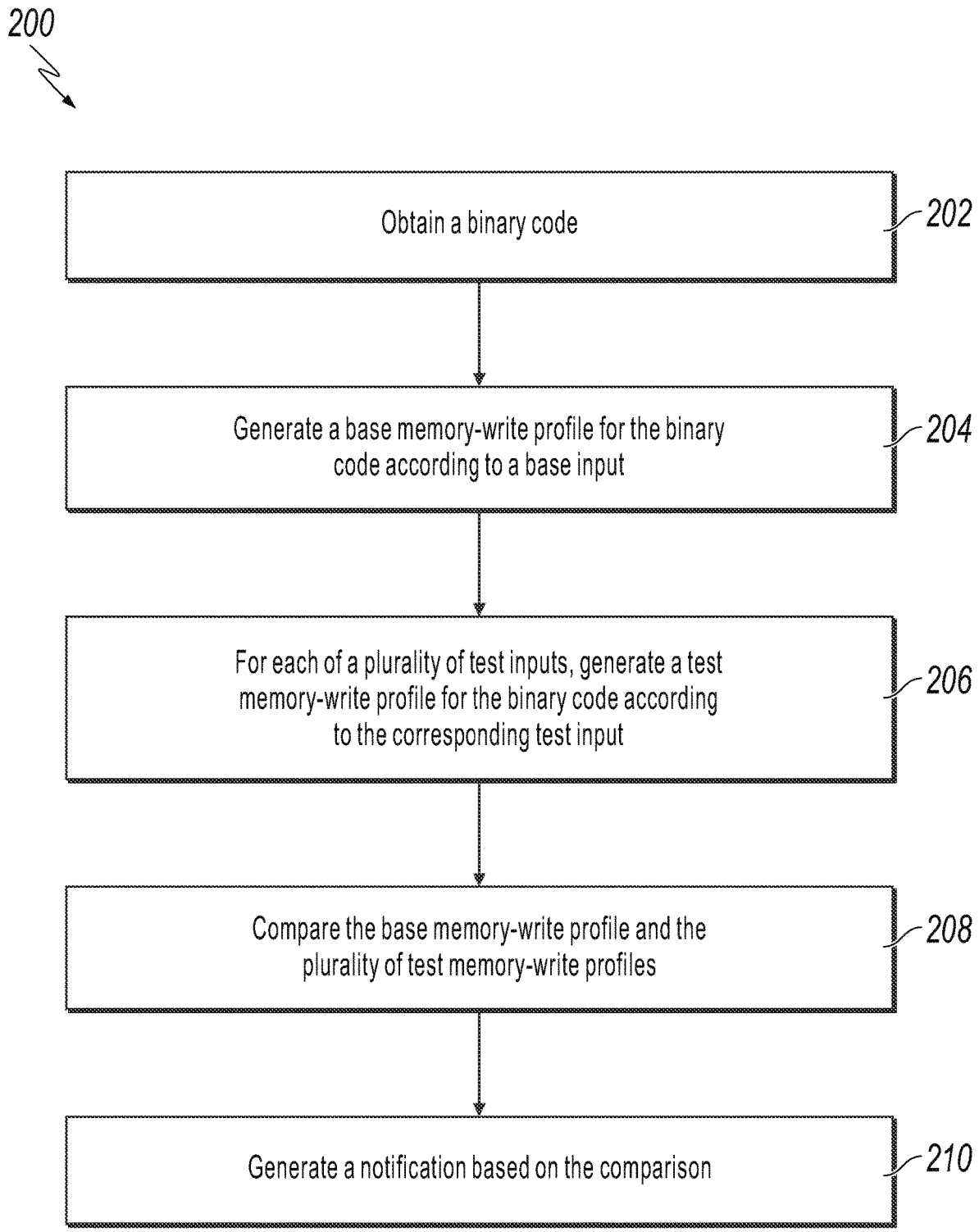
FIG. 2 is a flowchart showing an example method for detecting software vulnerabilities in a binary code, according to an implementation.
Figure 3:
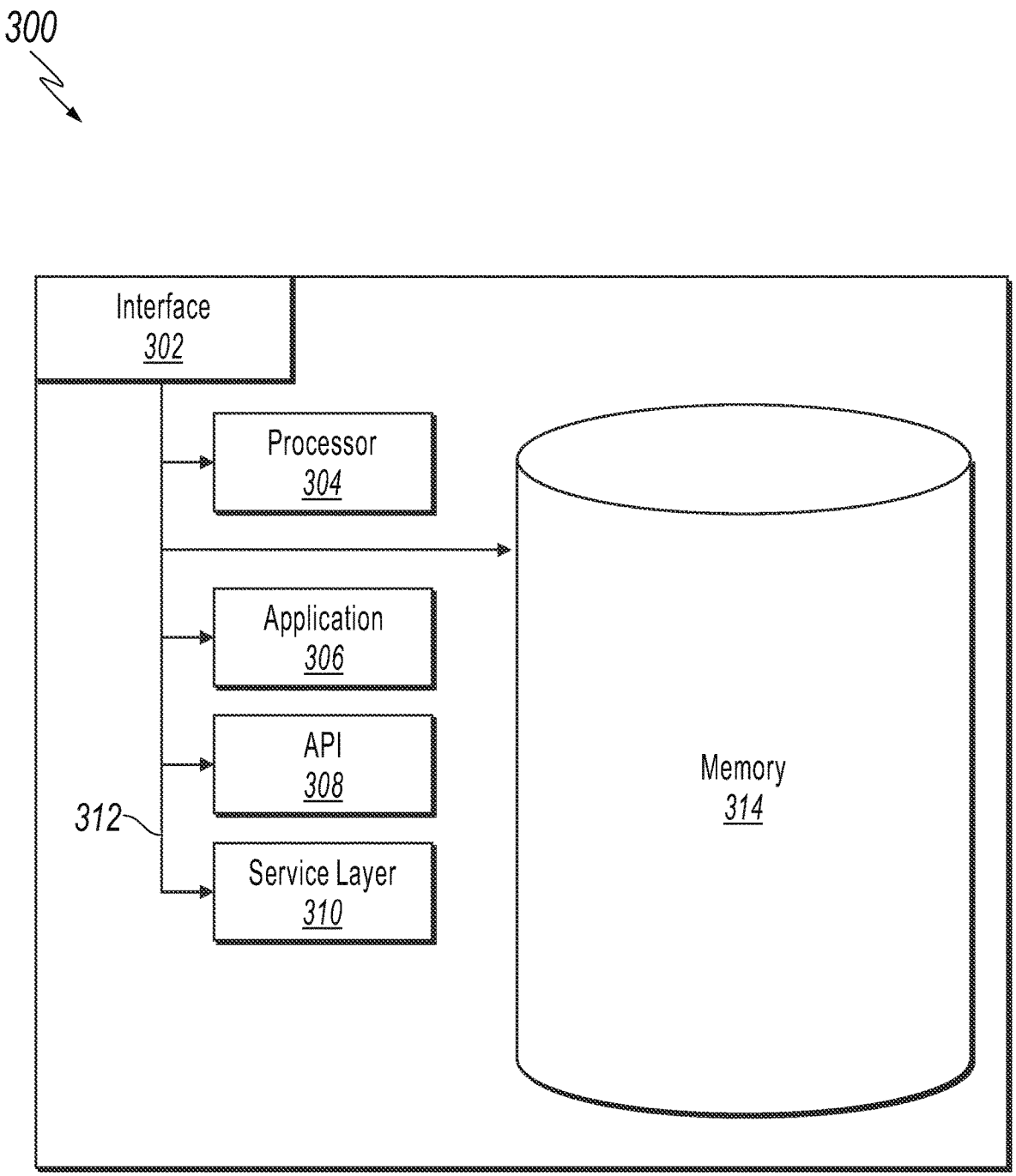
FIG. 3 is a high-level architecture block diagram of a server, according to an implementation.
Figure 4:
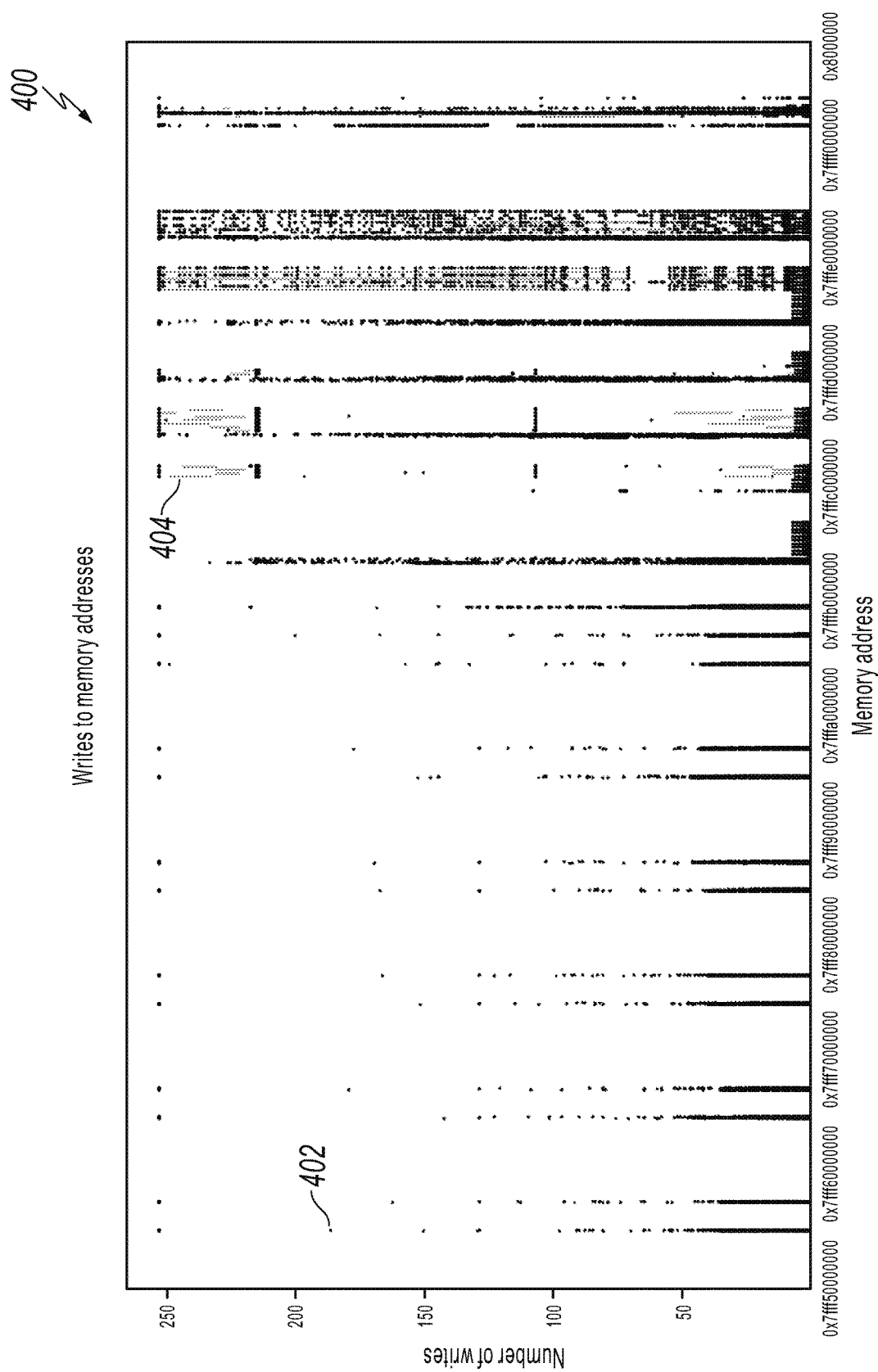
FIG. 4 is a diagram illustrating an example of a memory-write profile, according to an implementation.

The software analysis platform 104 includes a software analyzer 108 and a database 110. The software analyzer 108 represents an application, a set of applications, software, software modules, hardware, or any combination thereof, that can be configured to analyze the software's ability to handle input corruption, memory corruption, or both. In some implementations, the software analyzer 108 can monitor and identify the behavior changes in terms of the memory-write pattern of the binary code, when the input changes. The input can be one or more variables or parameters provided to the binary code being executed. For example, the software analyzer 108 can generate a plurality of test inputs, including malicious or invalid inputs (e.g., fault injection). The software analyzer 108 can determine the impact of a change in input data based on the changes to the memory-write profile. The software analyzer 108 can cross-check the impact of input data changes with the error alerts generated by the software to determine whether the software can handle fault injection correctly. The plurality of test inputs generated for testing the binary code are provided as one example for fault injection. In some other implementations, the fault injection can be corrupted memory. For example, one or more bits of the memory can be corrupted by modifying the original memory data into some test memory data. The software analyzer 108 can use the techniques described herein to determine the impact of the corrupted memory and determine whether the binary code can handle corrupted memory correctly. FIGS. 2-4 and associated descriptions provide additional details of these implementations.

The database 110 represents an application, a set of applications, software, software modules, hardware, or any combination thereof that can be configured to store memory-write profiles corresponding to different inputs, fault injection test results, error alerts generated by the software, notifications generated by the software analyzer, and any other relevant information for performing fault injection test. In operation, the software analyzer 108 can query information from the database 110. For example, the software analyzer 108 can query a base memory-write profile that represents a memory-write pattern when a base input is used for software execution. The software analyzer 108 can use the base memory-write profile to determine the behavior changes in terms of memory-write pattern, when the input changes. The software analyzer 108 can also store information into the database 110. For example, the software analyzer 108 can generate test memory-write profiles that are based on different test inputs and store the test memory-write profiles into the database 110. The software analyzer 108 can compare the base memory-write profile with the test memory-write profiles to determine the behavior changes of the different test inputs, thus determining the impact of changes in inputs. FIGS. 2-4 and associated descriptions provide additional details of these implementations. In some cases, as illustrated in FIG. 1, the database 110 can be implemented on the same platform as the software analyzer 108. Alternatively or additionally, the database 110 can be implemented on a different hardware platform that is accessible to the software analyzer 108.

The network 106 represents an application, a set of applications, software, software modules, hardware, or any combination thereof that can be configured to transmit data messages between the entities in the system 100. In some implementations, the software developer device 102 and the software analysis platform 104 are communicatively connected over the network 106, as shown in FIG. 1. In some implementations, the software developer device 102 and the software analysis platform 104 are the same device. The software analysis platform 104 is a module located on the software developer device 102. The software analysis platform 104 can access and analyze the binary code locally without the network 106. In some other implementations, the software developer device 102 and the software analysis platform 104 can be connected over local communication interfaces, such as cable connections, plug-in interfaces, or both.

The network 106 includes a wireless network, a wireline network, or a combination thereof. For example, the network 106 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within its coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate.

FIG. 2 is a flowchart showing an example method 200 for detecting software vulnerabilities in a binary code, according to an implementation. The example method 200 can be implemented by the software analysis platform 104 shown in FIG. 1. The example method 200 shown in FIG. 2 can be implemented using additional, fewer, or different operations, which can be performed in the order shown or in a different order.

The method 200 starts at step 202 with obtaining a binary code. In some cases, the binary code is received at the software analysis platform. In one example, the binary code can be submitted to the software analysis platform by a software developer device or other application servers over a network. In another example, the binary code can be submitted to the software analysis platform over local communication interfaces, such as cable connections, plug-in interfaces, or both. In a third example, the binary code is stored locally on the file system and made available to the software analysis platform running on the same computer. The binary code can represent an application software, a system software (e.g., an operating system or a device driver), or a combination thereof. The binary code can be received without the corresponding source code of the software. Thus, the binary code is not in a human readable format and cannot be easily parsed or analyzed.

In some implementations, the binary code of software can include different application program interfaces (APIs) with different functions. The binary code of software can define certain APIs or functions that handle fault injection. For example, the software can generate error alerts after detecting certain fault injection and move to a design safe state. However, in some cases, the software may not be able to recognize some fault injection and may not generate error alerts for the injected fault. In such cases, the injected fault may or may not be used during execution of the binary code, and thus may or may not cause behavior changes. Techniques described herein can assess whether the software can handle fault injection correctly. Techniques described herein can determine the impact of different inputs, memory corruption, or both, and further distinguish whether the injected fault causes behavior changes, even when the software does not recognize the injected fault.

In some implementations, general knowledge of the binary code is available. For example, the software analysis platform can have general knowledge of APIs and functions of the binary code, including the format, the type, the range of the valid inputs to the APIs and functions of the binary code.

At step 204, the method 200 generates a base memory-write profile for each base input processed by the binary code. Each base memory-write profile can include a count of memory updates for each of a plurality of memory locations during an execution of the binary code according to the base input. The memory-write profile can be the count of write operations on random access memory (RAM).

In some cases, there can be multiple base inputs. For each base input, a corresponding base memory-write profile is generated. Furthermore, for each base input, a set of test inputs are generated and a set of corresponding test memory-write profiles are obtained. To determine the impact of a change in input, for each base input, the base memory-write profile and the set of test memory-write profiles are compared.

In some implementations, the memory-write profile of the software provides additional information regarding the behaviors of the software. The memory can include a plurality of memory locations or memory addresses. Each memory location can be accessed or written into a certain number of times during the execution of the software. The memory-write profile defines, for each memory location, the number of memory updates during the execution. The memory-write profile is relatively deterministic for the same input. For example, for the same input, the vast majority of the memory is written into for a fixed number of times. In other words, the vast majority of the memory locations/addresses will not change the memory-write pattern unless the input changes. FIG. 4 and associated descriptions provide an example of a memory-write profile. If the memory locations that have variable access patterns independent of the input (e.g., the memory locations whose memory-write patterns change for the same input) are omitted, the remaining memory locations are those that will not change the access patterns unless the input changes.

FIG. 4 is a diagram illustrating an example of a memory-write profile for 11 million memory locations, according to an implementation. The results shown in FIG. 4 is obtained by executing a binary code using the same input multiple times. In this example, the binary code is executed ten times with the same input. During each execution, the count of memory writes for each memory location is obtained. After ten executions of the binary code, the memory-write profile of the binary code is shown in FIG. 4. It can be determined that vast majority of the memory locations are written into a fixed number of times. For example, each dot indicates that the corresponding memory location (X-axis) is written into a fixed number of times (Y-axis). As shown in dot 402, assuming the value of dot 402 is (address "A", number of write "P"), the memory location "A" is written into "P" times during each of the ten executions of the binary code. The line segments, which account for 0.01% of all memory locations written to, indicate that the corresponding memory locations are written into a varying number of times over the ten times of execution. As shown in line segment 404, assuming the two end points of the line segment 404 have values: (address "B", number of writes "Q_min") and (address "B", number of writes "Q_max"), the memory location "B" is written into for various times with the maximum value of "Q_max" and the minimum value of "Q_min". For example, in one execution, the memory location "B" is written into for "Q_min" times; in another execution, the memory location "B" is written into for "Q_max" times. However, as shown by the dots in FIG. 4, the vast majority of the memory locations are written into a fixed number of times. While it appears that there are many lines in FIG. 4, this is an artifact of graphing 11 million data points with very similar memory locations. Thus, the memory-write profile for the binary code is relatively deterministic for the same input. If the memory locations whose memory-write patterns change for the same input (e.g., reflected by the line segments) are omitted, the memory-write profile for the binary code is deterministic for the same input, and can be used to determine the impact of a change in input. While the memory-write profile is shown in a graphic format in FIG. 4, the memory-write profile can be in other formats, e.g., text, alphanumerical, binary, that can be used to store the count of memory updates discussed previously.

Based on such a property of the memory-write pattern, techniques described herein monitor the behavior of the software in terms of the memory-write pattern. The memory-write pattern is provided as one example. In some implementations, other memory access patterns, such as patterns for memory-read, memory-write, or a combination thereof, may be used to reflect the behavior of software.

To monitor the behavior changes of the software in terms of memory-write pattern, the software analysis platform first generates a base memory-write profile according to a base input. In some implementations, the software analysis platform can generate a base input that can be a valid input, according to the general knowledge of the software. The software analysis platform can execute the binary code using the base input, and monitor the memory-write pattern. Specifically, the software analysis platform can use a shadow memory to count the memory updates for each of the plurality of memory locations during the execution. As a result, the base memory-write profile including the count of memory updates for each of the plurality of memory locations is generated.

Shadow memory is a technique used to track and store information on computer memory used by a software program during execution. In one example, in addition to allocating a segment of operation memory that is used during the execution of the binary code, the software analysis platform can allocate a segment of shadow memory. Each value of the shadow memory may correspond to one or more bits or bytes in the operation memory. Each value of the shadow memory can store a counter of the memory-writes taking place in the corresponding bits or bytes in the operation memory. For example, every time the corresponding bits or bytes in the operation memory are written during the execution, the counter in the corresponding value in the shadow memory is increased by one. Therefore, when the execution of the binary code is completed, the shadow memory can provide a count of memory-writes during the execution for each memory address in the operation memory.

At step 206, for each of a plurality of test inputs, the method 200 generates a test memory-write profile for the binary code. The test memory-write profile includes a count of memory updates for each of the plurality of memory locations during an execution of the binary code according to the corresponding test input.

To test how the software responds to different inputs, including invalid inputs, the software analysis platform can generate a plurality of test inputs, and execute the binary code of the software using the plurality of test inputs. In some implementations, the software analysis platform can generate the test inputs based on a fuzzing process. The fuzzing process can be an automated testing technique that provides invalid, unexpected, or random data as inputs to the software. The execution of the software is monitored for exceptions, such as crashes, failures, or error alerts. In some cases, fuzzers are used to test programs that take structured inputs. The structure is specified, e.g., in a file format or other predetermined format. The fuzzer can generate different test inputs in the predetermined format. The fuzzer can generate semi-valid inputs in that the semi-valid inputs are not directly rejected by the parser of the software, but do create unexpected behaviors deeper in the program. In some implementations, the general knowledge of the binary code may define a set of predetermined rules for input requirements, such as the format, the type, and the range of inputs. The fuzzer can generate some of the test inputs based on the set of predetermined rules compliant with the input requirements, so that the test inputs are not directly rejected by the software. Techniques described herein use such test inputs and monitor the behavior changes caused by such test inputs.

The behavior changes monitored can be changes in terms of the memory-write profile. For each of the plurality of test inputs, the software analysis platform generates the test memory-write profile for the binary code. The test memory-write profile can include a count of memory updates for each of the plurality of memory locations during the execution of the binary code according to the corresponding test input. For example, for a particular test input, the software analysis platform can execute the binary code using the test input. The software analysis platform can count the number of times each memory location is written into or updated to obtain the memory-write profile of the binary code corresponding to the particular test input. The software analysis platform can use a shadow memory to count the memory updates for each of the plurality of memory locations during the execution.

At step 208, the method 200 compares the base memory-write profile and the plurality of test memory-write profiles. By comparing the base memory-write profile with each test memory-write profile, the software analysis platform can determine the impact of a change in input. Based on the comparison, it can be determined whether there is a difference between the base memory-write profile and each test memory-write profile. If there is a difference, the difference of at least one of the test memory-write profiles from the base memory-write profile can be obtained. For example, the software analysis platform can determine in which memory locations the counts of memory updates are different, the number of such memory locations where the counts of memory updates are different, and the difference of the count of the memory updates (e.g., amount of changes) in each of such memory locations, and the sum of the differences of the count of memory updates (e.g., the sum of the amount of changes) across such memory locations.

As discussed above, the memory-write profile is relatively deterministic for the same input. A change in input can produce one of the following two results. In the first case, a change in input does not result in a change in the memory-write profile. This means that the change in input may not be significant from a program execution standpoint. In the second case, a change in the input does result in a change in the memory-write profile. This means that the change in input is significant from a program execution standpoint. For the second case, the change in memory-write profile may not coincide with a corresponding change in execution flow. Techniques described herein can determine, even if the execution flow does not change, that the change in input causes the software program to behave differently.

At step 210, the method 200 generates a notification based on the comparison. The notification can indicate whether there is a difference between the base memory-write profile and the plurality of test memory-write profiles. In some cases, the notification can indicate the difference between the base memory-write profile and at least one of the test memory-write profiles. The difference may be the comparison results of the amount of changes, including the amount of location changes, or the amount of value changes, or both. For example, the notification can indicate the number of memory locations (e.g., amount of locations changes) where the count of memory updates in the at least one of the test memory-write profiles is different from the base memory-write profile. In another example, the notification can indicate a difference of the count of memory updates (e.g., amount of value changes) for at least one of the plurality of memory locations between at least one of the test memory-write profiles and the base memory-write profile. In some implementations, the comparison result can be the maximum value of change amount, the minimum value of change amount, the mean of change amount, the median of change amount, or any other statistical representations of the change amount. In some cases, the notification can indicate whether the software can handle fault injection (e.g., input corruption, memory corruption, or both) correctly. If there is a potential risk for security flaws, the notification may provide further information on the security flaws of the software.

In some cases, the notification can be provided to one or more other devices or tools, such as defect triage tool, for further analysis. Alternatively or additionally, the software analysis platform can return a response to the software developer device indicating whether the software includes potential risk for security flaws. In some cases, subsequent processes can be implemented to minimize the risk of security or safety flaws of the software.

In some implementations, the notification can further indicate whether there is an error alert generated during the execution of the binary code according to the test inputs. As discussed above, the software can include some APIs or functions that handle invalid inputs. As a result, the software can generate error alerts for some of the invalid test inputs. The notification from the software analysis platform can include such error alerts.

The notification regarding the changes of memory-write profiles and the error alerts generated by the software itself can be crosschecked to determine whether the software can handle input corruption correctly. Specifically, if the software generates one or more error alerts for a particular test input, and the notification from the software analysis platform indicates that there is no difference between the base memory-write profile and the test memory-write profile, it can be determined that the software rejects the particular invalid test input correctly without side-effects. More specifically, the fact that the software generates the error alerts indicates that the software recognizes that the particular test input is an invalid input. The software may not act on the particular test input during execution of the software. As a result, the software behavior in terms of the memory-write profile should not change. If the notification indicates no difference in the memory-write profile, it can be determined that the notification and the error alerts are consistent. Thus, it can be determined that the software handles the input corruption correctly.

However, in some cases, the software may not be able to recognize some invalid inputs and may not generate error alerts for the invalid inputs. In such cases, while the software itself may not be able to recognize the invalid inputs, techniques discussed herein can provide additional information on whether the invalid inputs cause behavior changes in terms of the memory-write profile. As a result, the described techniques can provide additional security information regarding invalid inputs (e.g., fault injection) even when the software does not recognize the invalid inputs.

The invalid inputs are provided as one example for fault injection. Other fault injection can include memory corruption. The process of determining the impact of invalid inputs described herein can be applied to determine the impact of corrupted memory in a similar manner, except that the memory bits that are corrupted are not included in the base memory-write profile and the test memory-write profiles.

For example, the software analysis platform can generate a base memory-write profile for the binary code according to a base input. As discussed previously, the base memory-write profile indicates a count of memory updates for each memory location in the operation memory during the execution of the binary code. The software analysis platform can select one or more memory locations in the operation memory and designate the selected memory locations as target corrupted memory locations. The software analysis platform then performs test execution of the binary code according to the same base input. During the test execution, the software analysis platform can introduce memory corruption on the target corrupted memory locations. The memory corruption can be introduced by modifying the target corrupted memory locations, overwriting random information on the target corrupted memory locations during the test execution. The software analysis platform can generate the test memory-write profile that indicates the count of memory updates for each memory location in the operation memory during the test execution of the binary code.

The software analysis platform can compare the count of the memory updates for memory locations other than the target corrupted memory locations in the base memory-write profile with the count of the memory updates for memory locations other than the target corrupted memory locations in the test memory-write profile to determine whether the software behavior is modified by the corrupted memory location.

FIG. 3 illustrates a high level architecture block diagram of a computer 300 according to an implementation. The computer 300 can be implemented as one of the software developer's device 102 and the software analysis platform 104 of FIG. 1. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The computer 300 includes a computing system configured to establish a secured code package for a browser plugin and generate a message communication when executing the plugin in the browser. In some cases, the computer 300 may include a computing system implementing processes and methods disclosed in FIGS. 2 to 4. In some cases, the processing algorithm of the code package establishment can be implemented in an executable computing code, e.g., C/C++ executable codes. In some cases, the computer 300 can include a standalone Linux system that runs batch applications. In some cases, the computer 300 can include mobile or personal computers.

The computer 300 may comprise a computer that includes an input device, such as a keypad, keyboard, touch screen, microphone, speech recognition device, other device that can accept user information, and/or an output device that conveys information associated with the operation of the computer, including digital data, visual and/or audio information, or a GUI.

The computer 300 can serve as a client, network component, a server, a database or other persistency, and/or any other components. In some implementations, one or more components of the computer 300 may be configured to operate within a cloud-computing-based environment.

At a high level, the computer 300 is an electronic computing device operable to receive, transmit, process, store, or manage data. According to some implementations, the computer 300 can also include or be communicably coupled with an application server, e-mail server, web server, caching server, streaming data server, business intelligence (BI) server, and/or other server.

The computer 300 can collect data of network events or mobile application usage events over network 140 from a web browser 130 or a client application, e.g., an installed plugin. In addition, data can be collected by the computer 300 from internal users (e.g., from a command console or by another appropriate access method), external or third parties, other automated applications, as well as any other appropriate entities, individuals, systems, or computers.

Each of the components of the computer 300 can communicate using a system bus 312. In some implementations, any and/or all the components of the computer 300, both hardware and/or software, may interface with each other and/or the interface 302 over the system bus 312 using an application programming interface (API) 308 and/or a service layer 310. The API 308 may include specifications for routines, data structures, and object classes. The API 308 may be either computer language-independent or -dependent and refer to a complete interface, a single function, or even a set of APIs. The service layer 310 provides software services to the computer 300. The functionality of the computer 300 may be accessible for all service consumers using this service layer. Software services, such as those provided by the service layer 310, provide reusable, defined business functionalities through a defined interface. For example, the interface may be software written in JAVA, C++, or other suitable languages providing data in Extensible Markup Language (XML) format or other suitable format. While illustrated as an integrated component of the computers 300, alternative implementations may illustrate the API 308 and/or the service layer 310 as stand-alone components in relation to other components of the computer 300. Moreover, any or all parts of the API 308 and/or the service layer 310 may be implemented as child or sub-modules of another software module, enterprise application, or hardware module without departing from the scope of this disclosure.

The computer 300 includes an interface 302. Although illustrated as a single interface 302 in FIG. 3, two or more interfaces 302 may be used according to particular needs, desires, or particular implementations of the computer 300. The interface 302 is used by the computer 300 for communicating with other systems in a distributed environment connected to a network (whether illustrated or not). Generally, the interface 302 comprises logic encoded in software and/or hardware in a suitable combination and operable to communicate with the network. More specifically, the interface 302 may comprise software supporting one or more communication protocols associated with communications such that the network or interface's hardware is operable to communicate physical signals within and outside of the computer 300.

The computer 300 includes at least one processor 304. Although illustrated as a single processor 304 in FIG. 3, two or more processors may be used according to particular needs, desires, or particular implementations of the computer. Generally, the processor 304 executes instructions and manipulates data to perform the operations of the computer 300. Specifically, the processor 304 executes the functionality required for establishing a described code package disclosed in FIGS. 1 to 4.

The computer 300 also includes a memory 314 that holds data for the computer 300. Although illustrated as a single memory 314 in FIG. 3, two or more memories may be used according to particular needs, desires, or particular implementations of the computer 300. While memory 314 is illustrated as an integral component of the computer 300, in alternative implementations, memory 314 can be external to the computer 300.

The application 306 is an algorithmic software engine providing functionality according to particular needs, desires, or particular implementations of the computer 300, particularly with respect to functionality required for anomaly detection. Although illustrated as a single application 306, the application 306 may be implemented as multiple applications 306 on the computer 300. In addition, although illustrated as integral to the computer 300, in alternative implementations, the application 306 can be external to the computer 300.

There may be any number of computers 300 associated with, or external to, and communicating over a network. Further, this disclosure contemplates that many users may use one computer 300, or that one user may use multiple computers 300.

Described implementations of the subject matter can include one or more features, alone or in combination.

For example, in a first implementation, a method, comprising: obtaining a binary code; generating a base memory-write profile for the binary code, wherein the base memory-write profile comprises a count of memory updates for each of a plurality of memory locations during an execution of the binary code according to a base input; for each of a plurality of test inputs, generating a test memory-write profile for the binary code, wherein the test memory-write profile comprises a count of memory updates for each of the plurality of memory locations during an execution of the binary code according to the corresponding test input; comparing the base memory-write profile and the plurality of test memory-write profiles; and generating a notification based on the comparison, wherein the notification indicates whether there is a difference between the base memory-write profile and the plurality of test memory-write profiles.

The foregoing and other described implementations can each, optionally, include one or more of the following features:

A first feature, combinable with any of the following features, wherein the base memory-write profile is generated by using a shadow memory to count the memory updates for each of the plurality of memory locations.

A second feature, combinable with any of the following features, wherein the notification indicates the number of memory locations where the count of memory updates in at least one of the test memory-write profiles is different from the base memory-write profile.

A third feature, combinable with any of the following features, wherein the notification indicates a difference of the count of memory updates for at least one of the plurality of memory locations between at least one of the test memory-write profiles and the base memory-write profile.

A fourth feature, combinable with any of the following features, wherein the test inputs are generated based on a fuzzing process.

A fifth feature, combinable with any of the following features, wherein the notification further indicate whether there is an error alert generated during the execution of the binary code according to the test inputs.

A sixth feature, combinable with any of the following features, wherein one or more of the plurality of test inputs are generated based on a set of predetermined rules.

In a second implementation, a computer-readable medium containing instructions which, when executed, cause a computing device to perform operations comprising: obtaining a binary code; generating a base memory-write profile for the binary code, wherein the base memory-write profile comprises a count of memory updates for each of a plurality of memory locations during an execution of the binary code according to a base input; for each of a plurality of test inputs, generating a test memory-write profile for the binary code, wherein the test memory-write profile comprises a count of memory updates for each of the plurality of memory locations during an execution of the binary code according to the corresponding test input; comparing the base memory-write profile and the plurality of test memory-write profiles; and generating a notification based on the comparison, wherein the notification indicates whether there is a difference between the base memory-write profile and the plurality of test memory-write profiles.

The foregoing and other described implementations can each, optionally, include one or more of the following features:

A first feature, combinable with any of the following features, wherein the base memory-write profile is generated by using a shadow memory to count the memory updates for each of the plurality of memory locations.

A second feature, combinable with any of the following features, wherein the notification indicates the number of memory locations where the count of memory updates in at least one of the test memory-write profiles is different from the base memory-write profile.

A third feature, combinable with any of the following features, wherein the notification indicates a difference of the count of memory updates for at least one of the plurality of memory locations between at least one of the test memory-write profiles and the base memory-write profile.

A fourth feature, combinable with any of the following features, wherein the test inputs are generated based on a fuzzing process.

A fifth feature, combinable with any of the following features, wherein the notification further indicate whether there is an error alert generated during the execution of the binary code according to the test inputs.

A sixth feature, combinable with any of the following features, wherein one or more of the plurality of test inputs are generated based on a set of predetermined rules.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: obtaining a binary code; generating a base memory-write profile for the binary code, wherein the base memory-write profile comprises a count of memory updates for each of a plurality of memory locations during an execution of the binary code according to a base input; for each of a plurality of test inputs, generating a test memory-write profile for the binary code, wherein the test memory-write profile comprises a count of memory updates for each of the plurality of memory locations during an execution of the binary code according to the corresponding test input; comparing the base memory-write profile and the plurality of test memory-write profiles; and generating a notification based on the comparison, wherein the notification indicates whether there is a difference between the base memory-write profile and the plurality of test memory-write profiles.

The foregoing and other described implementations can each, optionally, include one or more of the following features:

A first feature, combinable with any of the following features, wherein the base memory-write profile is generated by using a shadow memory to count the memory updates for each of the plurality of memory locations.

A second feature, combinable with any of the following features, wherein the notification indicates the number of memory locations where the count of memory updates in at least one of the test memory-write profiles is different from the base memory-write profile.

A third feature, combinable with any of the following features, wherein the notification indicates a difference of the count of memory updates for at least one of the plurality of memory locations between at least one of the test memory-write profiles and the base memory-write profile.

A fourth feature, combinable with any of the following features, wherein the test inputs are generated based on a fuzzing process.

A fifth feature, combinable with any of the following features, wherein the notification further indicate whether there is an error alert generated during the execution of the binary code according to the test inputs.

A sixth feature, combinable with any of the following features, wherein one or more of the plurality of test inputs are generated based on a set of predetermined rules.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatus with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a ROM or a RAM or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a PDA, a mobile audio or video player, a game console, a GPS receiver, or a portable storage device, e.g., a USB flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD, LED, or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a WLAN using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship with each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable formats. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

The invention claimed is:

1. A computer-implemented method comprising:
   obtaining a binary code;
   generating a base memory-write profile for the binary code, wherein the base memory-write profile comprises a count of memory updates for each of a plurality of memory locations during an execution of the binary code according to a base input;
   for each of a plurality of test inputs, generating a test memory-write profile for the binary code, wherein the test memory-write profile comprises a count of memory updates for each of the plurality of memory locations during an execution of the binary code according to the corresponding test input;
   comparing the base memory-write profile and the plurality of test memory-write profiles, wherein the comparing the base memory-write profile and the plurality of test memory-write profiles comprises: comparing a count of memory updates to a particular memory location in the base memory-write profile with a count of memory updates to the particular memory location the plurality of test memory-write profiles; and
   generating a notification based on the comparison, wherein the notification indicates whether there is a difference between the base memory-write profile and the plurality of test memory-write profiles.

2. The computer-implemented method of claim 1, wherein the base memory-write profile is generated by using a shadow memory to count the memory updates for each of the plurality of memory locations.

3. The computer-implemented method of claim 1, wherein the notification indicates a number of memory locations where the count of memory updates in at least one of the test memory-write profiles is different from the base memory-write profile.

4. The computer-implemented method of claim 1, wherein the notification indicates a difference of the count of memory updates for at least one of the plurality of memory locations between at least one of the test memory-write profiles and the base memory-write profile.

5. The computer-implemented method of claim 1, wherein the test inputs are generated based on a fuzzing process.

6. The computer-implemented method of claim 1, wherein the notification further indicates whether there is an error alert generated during the execution of the binary code according to the test inputs.

7. The computer-implemented method of claim 1, wherein one or more of the plurality of test inputs are generated based on a set of predetermined rules.

8. A non-transitory computer-readable medium containing instructions which, when executed, cause a computing device to perform operations comprising:
   obtaining a binary code;
   generating a base memory-write profile for the binary code, wherein the base memory-write profile comprises a count of memory updates for each of a plurality of memory locations during an execution of the binary code according to a base input;
   for each of a plurality of test inputs, generating a test memory-write profile for the binary code, wherein the test memory-write profile comprises a count of memory updates for each of the plurality of memory locations during an execution of the binary code according to the corresponding test input;
   comparing the base memory-write profile and the plurality of test memory-write profiles, wherein the comparing the base memory-write profile and the plurality of test memory-write profiles comprises: comparing a count of memory updates to a particular memory location in the base memory-write profile with a count of memory updates to the particular memory location the plurality of test memory-write profiles; and generating a notification based on the comparison, wherein the notification indicates whether there is a difference between the base memory-write profile and the plurality of test memory-write profiles.

9. The computer-readable medium of claim 8, wherein the base memory-write profile is generated by using a shadow memory to count the memory updates for each of the plurality of memory locations.

10. The computer-readable medium of claim 8, wherein the notification indicates a number of memory locations where the count of memory updates in at least one of the test memory-write profiles is different from the base memory-write profile.

11. The computer-readable medium of claim 8, wherein the notification indicates a difference of the count of memory updates for at least one of the plurality of memory locations between at least one of the test memory-write profiles and the base memory-write profile.

12. The computer-readable medium of claim 8, wherein the test inputs are generated based on a fuzzing process.

13. The computer-readable medium of claim 8, wherein the notification further indicates whether there is an error alert generated during the execution of the binary code according to the test inputs.

14. The computer-readable medium of claim 8, wherein one or more of the plurality of test inputs are generated based on a set of predetermined rules.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
  obtaining a binary code;
  generating a base memory-write profile for the binary code, wherein the base memory-write profile comprises a count of memory updates for each of a plurality of memory locations during an execution of the binary code according to a base input;
  for each of a plurality of test inputs, generating a test memory-write profile for the binary code, wherein the test memory-write profile comprises a count of memory updates for each of the plurality of memory locations during an execution of the binary code according to the corresponding test input;
  comparing the base memory-write profile and the plurality of test memory-write profiles, wherein the comparing the base memory-write profile and the plurality of test memory-write profiles comprises: comparing a count of memory updates to a particular memory location in the base memory-write profile with a count of memory updates to the particular memory location the plurality of test memory-write profiles; and
  generating a notification based on the comparison, wherein the notification indicates whether there is a difference between the base memory-write profile and the plurality of test memory-write profiles.

16. The computer-implemented system of claim 15, wherein the base memory-write profile is generated by using a shadow memory to count the memory updates for each of the plurality of memory locations.

17. The computer-implemented system of claim 15, wherein the notification indicates a number of memory locations where the count of memory updates in at least one of the test memory-write profiles is different from the base memory-write profile.

18. The computer-implemented system of claim 15, wherein the notification indicates a difference of the count of memory updates for at least one of the plurality of memory locations between at least one of the test memory-write profiles and the base memory-write profile.

19. The computer-implemented system of claim 15, wherein the test inputs are generated based on a fuzzing process.

20. The computer-implemented system of claim 15, wherein the notification further indicates whether there is an error alert generated during the execution of the binary code according to the test inputs.

\* \* \* \* \*